United States Patent [19]
Gulick, Jr.

[11] 3,747,100
[45] July 17, 1973

[54] APPARATUS FOR IDENTIFYING MAIN LOBE RESPONSES

[75] Inventor: Joseph F. Gulick, Jr., Clarksville, Md.

[73] Assignee: The United States of America as represented by the Secretary of the Navy, Washington, D.C.

[22] Filed: July 30, 1970

[21] Appl. No.: 59,403

[52] U.S. Cl. ......................................... 343/100 LE
[51] Int. Cl. .............................................. G01s 3/06
[58] Field of Search ............................... 343/100 LE

[56] References Cited
UNITED STATES PATENTS
3,167,761  1/1965  Parquier................ 343/100 LE UX
2,825,900  3/1958  Collbohm .................... 343/100 LE Primary Examiner—Benjamin A. Borchelt
Assistant Examiner—Richard E. Berger
Attorney—Richard S. Sciascia and J. A. Cooke

[57] ABSTRACT

Apparatus for instantaneously determining whether the angle of arrival of a signal is within an antenna main lobe or within a side lobe, which utilizes a high gain, highly directive antenna and a low gain, broad pattern antenna, in combination with a local oscillator, limiting amplifiers and a phase sensitive detector. The antennae are mounted so that their centers of radiation are coaxial and on a plane perpendicular to the axes of their respective main receiving lobes.

6 Claims, 4 Drawing Figures

INVENTOR.
JOSEPH F. GULICK JR.
BY

3,747,100

APPARATUS FOR IDENTIFYING MAIN LOBE RESPONSES

BACKGROUND OF THE INVENTION

This invention relates to a radar receiving system and more particularly to apparatus for determining whether an incoming signal is within the main lobe or a side lobe of the receiving antenna.

Some types of passive pulse radar receivers require the ability to receive and sort signals of widely different amplitudes arriving at the receiving antenna from various directions essentially simultaneously. In many cases, such as in direction finding applications, the intensity of a signal arriving in a side lobe may be many times greater than the main lobe signal intensity. Conventional receiving systems which essentially use only the amplitude of the received signal cannot distinguish between a weak signal in the main lobe and a strong signal in a side lobe on an instantaneous pulse-by-pulse basis. Accordingly, those prior art systems which use signal amplitude as a basis for discrimination will lose valuable intelligence if it is necessary to instantaneously determine the general origin of the incoming signal, i.e., whether the signal was received by the main lobe or in one of the side lobes.

SUMMARY OF THE INVENTION

In carrying out the present invention, a high gain, highly directive antenna and a low gain, broad pattern antenna are arranged in such a manner that their centers of radiation are in a plane perpendicular to the axis of the main receiving lobe. A further requirement is that the main lobe axes of both the high gain and low gain antennae be essentially superimposed. The received signals emergent from each antenna will produce distinct signal patterns when the antennae outputs are both summed with and subtracted from each other. These distinct signal patterns will readily identify either main or side lobe reception upon processing by a phase sensitive detector.

It is therefore an object of this invention to provide apparatus which will instantaneously, on a pulse-by-pulse basis, indicate whether the angle of arrival of a signal is within the antenna main lobe or in a side lobe.

Still another object is the provision of a system which will be able to discriminate between main lobe or side lobe signals of equal decibel strength.

A further object of the subject invention resides in the conjunctive utilization of a high gain, highly directive antenna with a low gain, broad pattern antenna.

A still further object is to provide a side or main lobe indicating system which utilizes a phase sensitive detector.

Yet another object of the present invention is to provide a system that maintains the same phase relationship between signals received in the highly directive antenna and those in the broad pattern antenna.

DESCRIPTION OF THE PREFERRED EMBODIMENTS

Figure 1:
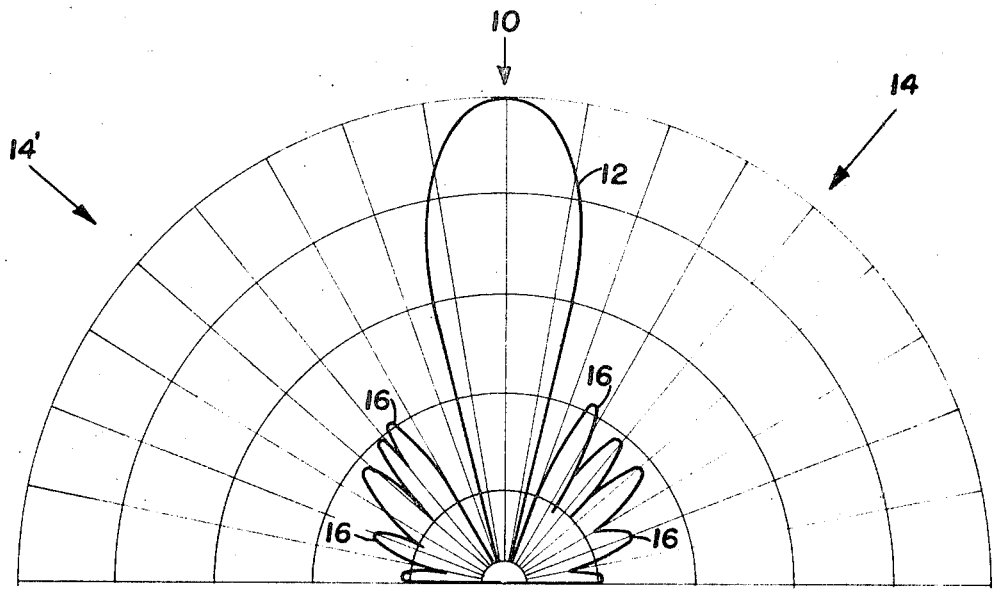
FIG. 1 shows the antenna pattern of a conventional high gain receiving antenna.

FIG. 1 shows the typical pattern of a conventional high gain receiving antenna. Signals arriving from the direction 10 are received within a main receiving lobe 12 while signals arriving from the direction 14 and 14' are received within any of the antenna side lobes 16. In many cases, such as in direction finding applications, the strength of signals arriving in the side lobes 16 may be many times greater than that of signals received within the main lobe 12. Conventional receiving systems which use essentially only the amplitude of the received signal cannot distinguish between a weak signal in the main lobe and a strong signal in a side lobe on an instantaneous pulse-by-pulse basis.

Figure 2:
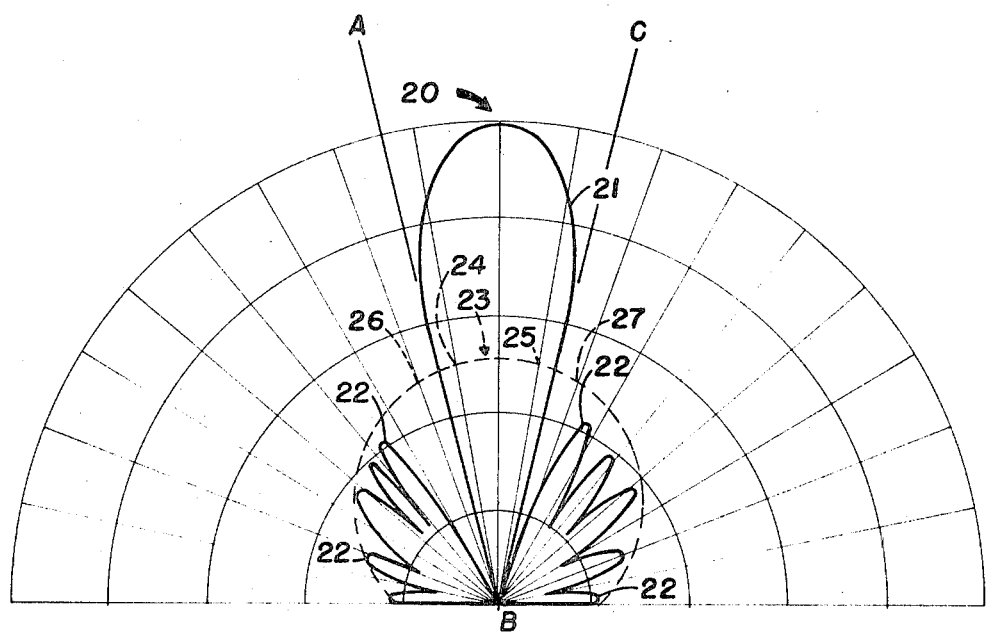
FIG. 2 shows the resultant antenna pattern when the pattern of a highly directive antenna is superimposed upon the pattern of a broad band antenna, according to the present invention.

FIG. 2 shows the resultant antenna receiving pattern if a high gain, highly directive antenna is superimposed upon a low gain, broad pattern antenna in such a manner that their centers of radiation are in coaxial and on a plane perpendicular to the axis of the main lobes. As stated above, the antenna pattern of FIG. 2 is produced by combining the antenna pattern 20 of a high gain antenna, which comprises main lobe 21 and side lobes 22, with the antenna pattern 23 of a low gain antenna. The centers of radiation for both the high gain antenna pattern 20 and low gain antenna pattern 23 are located at the reference point identified by the reference letter "B". Since the increments in the radial graph represent decibel intensity, the main lobe of the low gain antenna pattern 23 (which it will be recalled is a broad pattern antenna) is that portion which exhibits the maximum decibel intensity. Thus the main lobe could be considered as lying between points 24 and 25 or between points 26 and 27. In this respect, therefore, the main lobe of both the high gain antenna pattern 20 and the low gain antenna pattern 23 are essentially superimposed. Also, the main lobes of both antennae patterns have greater sensitivity than those of the side lobes.

Reference will now be made to the principal object of the subject invention, i.e., the instantaneous pulse-by-pulse determination of whether the angle of arrival of an incoming signal is within the antenna main lobe or in a side lobe. With continuing reference to FIG. 2, signals arriving within the angle ABC will produce a signal in the high gain antenna of greater amplitude than produced in the low gain antenna. If the signal produced by the high gain antenna is denoted by X and that produced by the low gain antenna by Y, then X and Y can be combined in a conventional manner to form the algebraic sum of $(X + Y)$ and the difference $(X - Y)$. If the magnitude $|X|$ of X is greater than the magnitude $|Y|$ of Y, the signs of the quantities $(X + Y)$ and $(X - Y)$ will be the same. Expressed mathematically:

if $|X| > |Y|$ then $(X + Y) > 0$ and $(X - Y) > 0$

However, if $|X| < |Y|$ ; i.e., the signal is received by said lobes 22 rather than by main lobe 21, then $(X + Y) > 0$
and $(X - Y) < 0$ In the former example of $|X| > |Y|$, i.e., the signs of the quantities $(X + Y)$ and $(X - Y)$ are the same, the signals X and Y will be in phase electrically. Expressed vectorially, if $\xrightarrow{X}$ is the magnitude of X and $\xrightarrow{Y}$ is the magnitude of Y then $\xrightarrow{X-Y}$ is the magnitude of $(X-Y)$ and $\xrightarrow{Y}\xrightarrow{X}\xrightarrow{X+Y}$ is the magnitude of $(X+Y)$ However, if the signal is received by one of the side lobes 22, i.e., X < Y, then the two signals will be electrically out of phase. Expressed vectorially, if $\xrightarrow{Y}$ is the magnitude of Y and $\xrightarrow{X}$ is the magnitude of X then $\xrightarrow{X}\xrightarrow{Y}\xrightarrow{X+Y}$ is the magnitude of $(X+Y)$ and $\xleftarrow{X-Y}$ is the magnitude of $(X-Y)$ Thus it can be seen that when $|X| < |Y|$, the quantities $(X + Y)$ and $(X - Y)$ are 180° out of phase. This relationship can be transformed into practical results by identifying and discriminating side lobe signals from signals received in the main lobe. The precise method of such discrimination will be described in detail below.

Figure 3:
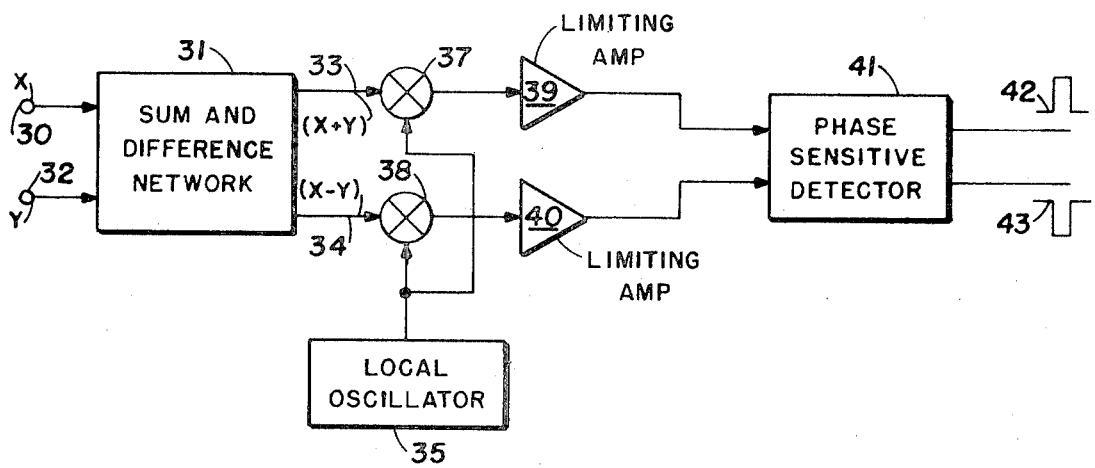
FIG. 3 is a block diagram of the processing circuitry of the present invention.

FIG. 3 shows a block diagram of a discriminating circuit in which those signals received in the main lobe of the high gain antenna pattern 20 of FIG. 2 are segregated from those signals received by the side lobes of said antenna pattern. The X signal from the high gain antenna pattern 20 of FIG. 1 is applied to an input terminal 30 of a sum and difference network 31. Similarly, the Y signal from the low gain antenna pattern 23 of FIG. 1 is applied to an input terminal 32 of the sum and difference network 31.

Emergent from the sum and difference network 31 are the signal quantities $(X + Y)$, shown at 33, and $(X - Y)$, shown at 34. As mentioned previously, if the signs of the two quantities are the same, the two signals represented by $(X + Y)$ and $(X - Y)$ will be in phase electrically. If the signs of the two quantities are different, the signals will be out of phase with each other. Signal quantities $(X + Y)$ and $(X - Y)$ are heterodyned with a local oscillator 35 through mixers 37 and 38 respectively. It should be noted that the heterodyning process is accomplished without destroying the basic phase information of the two signal quantities. The purpose of the heterodyning process is to reduce the microwave frequencies of X and Y to intermediate frequencies. The signal quantites $(X + Y)$ and $(X - Y)$ emergent from the mixers 37 and 38 are applied to limiting amplifiers 39 and 40 respectively in which the sinusoidal signal quantities $(X + Y)$ and $(X - Y)$ are clipped to produce square waves, yet still maintaining the same phase relationship. Since the desired information is the phase relationship between the two signal quantities, limiting their amplitude does not destroy this phase relationship. The information produces a constant output (within the limiting range) regardless of the strength of the received signal. The square wave outputs of limiting amplifiers 39 and 40 are applied to a phase sensitive detector 41 which produces a positive output 42 when the two signal quantities $(X + Y)$ and $(X - Y)$ are in phase. Likewise, phase sensitive detector 41 produces a negative output 43 when said signal quantities are out of phase with each other. Recapitulating briefly, a positive output from phase sensitive detector 41 indicates that the received signal is being processed by the main lobe of the high gain antenna. It will be recalled that when a signal is received in the main lobe of said antenna it is also being simultaneously received by a low gain antenna in the manner illustrated in FIG. 2. When the signals received by each of the above antennae are combined into signal quantities representing the sum and difference of said received signals, said combined signal quantities will be in phase with each other when the incoming signal is being received by the main lobe of the high gain antenna and conversely will be out of phase with each other when said incoming signal is being received by a side lobe of said high gain antenna. Following the converse of this logic, a negative output from phase sensitive detector 41 indicates that the received signal is being processed by a side lobe of the high gain antenna.

Conventional circuitry (not shown in FIG. 3) can be used to follow the phase sensitive detector that responds only to positive polarity signals, thereby eliminating the side lobe responses on a pulse-to-pulse basis independent of the strength of the received signal.

Figure 4:
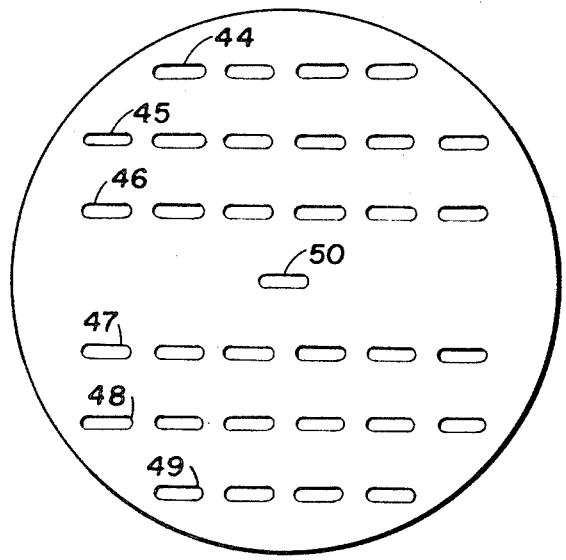
FIG. 4 shows a flat plate slotted array that exhibits the antenna pattern of FIG. 2.

FIG. 4 shows a possible antenna configuration that will provide the necessary antenna pattern of FIG. 2. In FIG. 4, there is shown a flat plate slot array antenna. The high gain narrow pattern is provided by the array slot elements in rows 44 through 49. The low gain, broad pattern is provided by the center slot array element 50.

In summary, apparatus has been disclosed which provides for the instantaneous, pulse-by-pulse indentification of antenna main or side lobe signals. This can be accomplished regardless of the strength of the received signal.

Obviously many modifications and variations of the present invention are possible in light of the above teachings. It is therefore to be understood that within the scope of the appended claims, the invention may be practiced otherwise than as specifically described.

What is claimed and desired to be secured by Letters Patent of the United States is:

1. In an antenna receiving system, the combination comprising:
   a first antenna exhibiting a relatively high gain, highly directive receiving pattern, said receiving pattern comprising a high sensitivity main receiving lobe and a plurality of side lobes of lesser sensitivity;
   a second antenna exhibiting a relatively low gain, broad receiving pattern, said second antenna receiving pattern being composed of a single main receiving lobe of greater sensitivity than that of said side lobes of said first antenna but of lesser sensitivity than that of said main receiving lobe of said first antenna, said first and second antennae being so oriented with respect to each other that their centers of radiation are coaxial and on a plane perpendicular to the axes of their main receiving lobes; and
   means for combining the outputs of said first and second antennae to produce a first signal representative of the sum of said antennae outputs and a second signal representative of the difference of said antennae outputs, whereby said first signal will be in electrical phase with said second signal when said incoming signals are being received by said main lobe of said first antenna and said first signal will be out of electrical phase with said second signal when said incoming signals are being received by one of said plurality of side lobes of said first antenna.

2. The antenna receiving system of claim 1 wherein said combining means is a sum and difference network.

3. The antenna receiving system of claim 2 further comprising means for receiving said sum and difference signals and thereupon indicating when said sum and difference signals are in phase and when they are out of phase.

4. The antenna receiving system of claim 3 wherein said indicating means is a phase sensitive detector which emits a first pulse of one polarity which indicates an in-phase relationship between said sum and said difference signals and a second pulse of the opposite polarity when said sum and said difference signals are in an out-of-phase relationship.

5. The antenna receiving system of claim 4 further comprising means connected between the output of said sum and difference amplifier and the input of said phase sensitive detector for limiting the amplitude of said sum signal and said difference signal, thereby allowing the output of said phase sensitive detector to be independent of said received signal amplitude.

6. The antenna receiving system of claim 5 wherein said limiting means is a pair of limiting amplifiers, one amplifier of said pair being connected to receive said sum signal and the other to receive the difference signal.

* * * * *